United States Patent [19]
Merrill et al.

[11] Patent Number: 6,114,477
[45] Date of Patent: *Sep. 5, 2000

[54] POLYMERIZATION PROCESS

[75] Inventors: Natalie Ann Merrill, Deer Park; Jo Ann Marie Canich, Webster; Armenag Hagop Dekmezian; Richard Byron Pannell, both of Kingwood; Charles James Ruff, Houston, all of Tex.

[73] Assignee: Exxon Chemical Patents Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/598,860

[22] Filed: Feb. 9, 1996

[51] Int. Cl.$^7$ ........................................ C08F 2/34
[52] U.S. Cl. .......................... 526/68; 526/160; 526/901; 526/943; 526/352; 526/70; 526/88
[58] Field of Search .................................. 526/160, 901, 526/943, 352, 70, 88, 68

[56] References Cited

U.S. PATENT DOCUMENTS

| | | | |
|---|---|---|---|
| 4,404,344 | 9/1983 | Sinn et al. | 526/160 |
| 4,431,788 | 2/1984 | Kaminsky et al. | 527/313 |
| 4,542,199 | 9/1985 | Kaminsky et al. | 526/160 |
| 4,544,762 | 10/1985 | Kaminsky et al. | 556/179 |
| 4,586,995 | 5/1986 | Randall et al. | 522/5 |
| 4,588,790 | 5/1986 | Jenkins, III et al. | 526/70 |
| 4,987,212 | 1/1991 | Morterol et al. | 526/348.4 |
| 5,218,071 | 6/1993 | Tsutsui et al. | 526/348 |
| 5,272,236 | 12/1993 | Lai et al. | 526/348.5 |
| 5,317,036 | 5/1994 | Brady, III et al. | 526/351 |
| 5,332,706 | 7/1994 | Nowlin et al. | 526/114 |
| 5,380,810 | 1/1995 | Lai et al. | 526/352 |
| 5,405,922 | 4/1995 | DeChellis et al. | 526/160 |
| 5,661,098 | 8/1997 | Harrison et al. | 502/102 |
| 5,712,352 | 1/1998 | Brant et al. | 526/68 |

FOREIGN PATENT DOCUMENTS

| | | |
|---|---|---|
| 0 035 242 | 9/1981 | European Pat. Off. . |
| 0 170 059 | 5/1986 | European Pat. Off. . |
| 0 313 386 | 4/1989 | European Pat. Off. . |
| 452920A2 | 10/1991 | European Pat. Off. . |
| 0495099A1 | 7/1992 | European Pat. Off. . |
| 0 575 123 | 12/1993 | European Pat. Off. . |
| 0 659 773 A1 | 6/1995 | European Pat. Off. . |
| 0659773A1 | 6/1995 | European Pat. Off. . |
| 0 676 421 A1 | 10/1995 | European Pat. Off. . |
| 0676421A1 | 10/1995 | European Pat. Off. . |
| 0683184A1 | 11/1995 | European Pat. Off. . |
| 2 608 863 | 9/1977 | Germany . |
| 94/07928 | 4/1994 | WIPO . |
| 95/00526 | 1/1995 | WIPO . |
| 95/07942 | 3/1995 | WIPO . |
| WO 96/00246 | 1/1996 | WIPO . |

OTHER PUBLICATIONS

"Polyethylene Melt Viscosity: Shear Rate–Temperature Superposition," Mendelson, vol. 9:1, 53–63 (1965), Transactions of the Society of Rheology.

William W. Graessley, *Macromolecules* 1982, 15, 1164–1167, "Effect of Long Branches on the Temperature Dependence of Viscoelastic Properties in Polymer Melts".

Robert A. Mendelson, *Transactions of the Society of Rheology* 9:1, 53–63 (1965), "Polyethylene Melt Viscosity: Shear Rate–Temperature Superposition".

William W. Graessley, *Accounts of Chemical Research*, 10, 332 (1977), "Effect of Long Branches on the Flow Properties of Polymers".

P.J. Maddox, C. Chabrand, P.S. Home, P.S., Williams, *SPO '94*, pp. 279–286, "Metallocenes in the BP Fluid Bed Process—high strength mono– and bimodal products".

Dr. James C. Hsu, *SPO '94*, pp. 9–27, "Polymer–Supported Catalysts for Ziegler–Natta and Metallocene Polymerization".

*Primary Examiner*—David W. Wu
*Assistant Examiner*—Ling-Siu Choi

[57] ABSTRACT

The present invention relates to a gas phase process for the polymerization of monomer(s) utilizing a metallocene catalyst system to produce easy processing polyolefin polymers.

11 Claims, No Drawings

POLYMERIZATION PROCESS

FIELD OF THE INVENTION

The present invention relates to a gas phase process for the polymerization of olefin(s) utilizing as the catalyst a bulky ligand transition metal compound and an activator to produce a polymer product that is easier to process. More particularly, the invention is directed to a continuous gas phase polymerization process for polymerizing olefin(s) utilizing a metallocene catalyst system to produce polymers having improved processability and physical properties useful in a variety of end-use applications, especially where processability is important, for example, in blown and cast film production.

BACKGROUND OF THE INVENTION

The production of polymers having improved processability utilizing metallocene catalyst systems in a solution phase polymerization process has been discussed in the art. For example, U.S. Pat. Nos. 5,272,236 and 5,380,810 describe a specific group of metallocene catalysts, namely monocylcopentadienyl metallocene systems, that are said to be capable of producing polymers having a high melt flow ratio and a narrow molecular weight distribution using a solution phase polymerization process. U.S Pat. No. 5,218, 071 describes a solution process to produce a metallocene derived ethylene copolymer having a narrow molecular weight distribution and excellent flowability. EP-A1-0 683 184 published Nov. 22, 1995 describes a solution process using metallocenes to produce polymers having high viscous flow activation energies for good film moldability.

The gas phase production of polymers having improved processability using metallocene catalysts is known. For example, WO 95/07942 published Mar. 23, 1995 describes a gas phase fluidized bed process for producing ethylene polymers having improved processability using a monocyclopentadienyl transition metal metallocene catalyst compound and non-coordinating anion activator. EP-A2-0 452 920 published Oct. 23, 1991 describes a gas phase process for producing ethylene copolymers said to have a high melt tension and a narrow composition distribution using a prepolymerized catalyst system of a variety of metallocene catalyst compounds, including unbridged and bridged bis-cyclopentadienyl transition metal metallocene compounds. EP-A1-0 659 773 published Jun. 28, 1995 describes a gas phase process for producing polyethylene at a certain temperature showing improved processability using an unsupported catalyst system of one or more bridged bis-cyclopentadienyl transition metal metallocene catalyst compounds. EP-A1-0 676 421 published Nov. 10, 1995 describes the gas phase production of polyolefins showing improved processability using a supported catalyst system of a bridged bis-cyclopentadienyl transition metal metallocene catalyst compound.

Thus, it would be highly desirable to have a gas phase polymerization process that produces polymers that have superior strength/toughness properties and have improved processability without the need for catalyst specificity.

SUMMARY OF THE INVENTION

This invention relates to a gas phase polymerization process for polymerizing ethylene, preferably in combination with one or more other olefins utilizing a bulky ligand transition metal catalyst, for example, a metallocene catalyst or catalyst system, to produce a polymer product having improved processability and other physical properties for use in various blend compositions and end-use applications.

DETAILED DESCRIPTION OF THE INVENTION

Introduction

In a typical gas phase process, a continuous recycle stream is employed. The recycle stream is heated by the heat of polymerization, and in another part of the process, heat is removed by a cooling system external to the reactor. The recycle stream usually contains one or more monomers continuously cycled through a fluidized bed in the presence of the catalyst under polymerization conditions. The recycle stream is withdrawn from the fluidized bed and recycled back into the reactor. Simultaneously, polymer product is withdrawn from the reactor and new or fresh monomer is added to replace the polymerized monomer.

It has been discovered that by reducing the partial pressure of monomer introduced to a polymerization reactor it is possible to produce polymers having improved processability with a variety of a transition metallocene catalyst compounds. Further, it was surprisingly discovered that by varying the reactor temperature the processability of the polymer product could be controlled.

Catalyst Components and Catalyst Systems

Preferred metallocene catalysts of the invention, for example, are typically those bulky ligand transition metal complexes derivable from the formula:

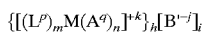

where L is a bulky ligand bonded to M, p is the anionic charge of L and m is the number of L ligands and m is 1, 2 or 3; A is a ligand bonded to M and capable of inserting an olefin between the M-A bond, q is the anionic charge of A and n is the number of A ligands and n is 1, 2, 3 or 4, M is a metal, preferably a transition metal, and (p×m)+(q×n)+k corresponds to the formal oxidation state of the metal center; where k is the charge on the cation and k is 1, 2, 3 or 4, and B' is a chemically stable, non-nucleophillic anionic complex, preferably having a molecular diameter of 4 Å or greater and j is the anionic charge on B', h is the number of cations of charge k, and i the number of anions of charge j such that h×k=j×i.

Any two L and/or A ligands may be bridged to each other and/or unbridged. The catalyst compound may be full-sandwich compounds having two or more ligands L, which may be cyclopentadienyl ligands or substituted cyclopentadienyl ligands, or half-sandwich compounds having one ligand L, which is a cyclopentadienyl ligand or heteroatom substituted cyclopentadienyl ligand or hydrocarbyl substituted cyclopentadienyl ligand such as an indenyl ligand, a benzindenyl ligand or a fluorenyl ligand and the like or any other ligand capable of η-5 bonding to a transition metal atom. One or more of these bulky ligands is π-bonded to the transition metal atom. Each L can be substituted with a combination of substituents, which can be the same or different. Non-limiting examples of substituents include hydrogen or a linear, branched or cyclic alkyl, alkenyl or aryl radical or combination thereof having from 1 to 30 carbon atoms. The substituent can also be substituted with hydrogen or a linear, branched or cyclic alkyl, alkenyl or aryl radical having from 1 to 30 carbon atoms. L may also be other types of bulky ligands including but not limited to bulky amides, phosphides, alkoxides, aryloxides, imides, carbolides, borollides, porphyrins, phthalocyanines, corrins and other polyazomacrocycles. The metal atom, from the Periodic Table of the Elements, may be a Group 4, 5 or 6 transition metal or a metal from the lanthanide and actinide series, preferably the transition metal is of Group 4. Other ligands may be bonded to the transition metal, such as a leaving group, such as but not limited to weak bases such amines, phosphines, ether and the like. In addition to the transition metal, these ligands may be optionally bonded to A or L. Non-limiting examples of catalyst components and catalyst systems are discussed in for example, U.S. Pat. Nos. 4,530, 914, 4,871,705, 4,937,299, 5,124,418, 5,017,714, 5,120,867, 5,278,264, 5,278,119, 5,304,614, 5,324,800, 5,347,025, 5,350,723, 5,391,790, 5,391,789 and 5,455,366 all of which are herein fully incorporated by reference. Also, the disclosures of European Publications EP-A-0 591 756, EP-A-0 520 732 and EP-A-0 420 436 and PCT Publications WO 91/04257, WO 92/00333, WO 93/08221, WO 93/08199 and WO 94/01471 are all fully incorporated herein by reference.

It is within the scope of this invention that $Ni^{2+}$ and $Pd^{2+}$ complexes described in the articles Johnson, et al. "New Pd(II)- and Ni(II)-Based Catalysts for Polymerization of Ethylene and a-Olefins", J. Am. Chem. Soc. 1995, 117, 6414–6415 and "Copolymerization of Ethylene and Propylene with Functionalized Vinyl Monomers by Palladium(II) Catalysts", J. Am. Chem. Soc., 1996, 118, 267–268, which are both fully incorporated by reference, can be used as catalysts. These complexes can be either dialkyl ether adducts, or alkylated reaction products of the described dihalide complexes that can be activated to a cationic state by the activators of this invention. It is also within the scope of the process of this invention that the above described complexes can be combined with one or more of the catalyst compounds represented by formula (I) and (II), with one or more of the activators or cocatalysts, and with one or more of the support materials using one of the support methods, all of which are described below.

In one embodiment, the activated catalyst of the invention is formed from a catalyst compound represented by the general formula:

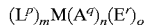

where L, M, A, and p, m, q and n are as defined above and E is an anionic leaving group such as but not limited to hydrocarbyl, hydride, halide or combination thereof or any other anionic ligands; r is the anionic charge of E and o is the number of E ligands and o is 1, 2, 3 or 4 such that $(p \times m)+(q \times n)+(r \times o)$ is equal to the formal oxidation state of the metal center, and an aluminum alkyl, alumoxane, modified alumoxane or any other oxy-containing organometallic compound or non-coordinating ionic activators, or a combination thereof.

Further, the catalyst component of the invention includes monocyclopentadienyl heteroatom containing compounds. This heteroatom is activated by either an alumoxane, modified alumoxane, a non-coordinating ionic activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031 and 5,304,614, PCT publications WO 93/08221, WO 93/08199 and WO 95/07140 and EP-A-0 578 838, EP-A-0 638 595 all of which are herein fully incorporated by reference.

The preferred transition metal component of the catalyst of the invention are those of Group 4, particularly, titanium, zirconium and hafnium. The transition metal may be in any formal oxidation state, preferably +2, +3 or +4 or a mixture thereof, preferably +4.

In another embodiment the catalyst component is represented by one of the formula (I):

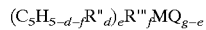

wherein M is a Group 4, 5, 6 transition metal, at least one $(C_5H_{5-d-f}R''_d)$ is an unsubstituted or substituted cyclopentadienyl ligand bonded to M, each R'', which can be the same or different is hydrogen or a substituted or unsubstituted hydrocarbyl having from 1 to 30 carbon atoms or combinations thereof or two or more carbon atoms are joined together to form a part of a substituted or unsubstituted ring or ring system having 4 to 30 carbon atoms, R''' is one or more or a combination of carbon, germanium, silicon, phosphorous or nitrogen atoms containing radical bridging two $(C_5H_{5-d-f}R''_d)$ rings, or bridging one $(C_5H_{5-d-f}R''_d)$ ring to M; each Q which can be the same or different is a hydride, substituted or unsubstituted hydrocarbyl having from 1 to 30 carbon atoms, halogen, alkoxides, aryloxides, amides, phosphides or any other univalent anionic ligand or combination thereof; two Q can be an alkylidene ligand or cyclometallated hydrocarbyl ligand or other divalent anionic chelating ligand, where g is an integer corresponding to the formal oxidation state of M, d is 0, 1, 2, 3, 4 or 5, f is 0 or 1 and e is 1, 2 or 3.

In another preferred embodiment of this invention the catalyst component is represented by the formula (II):

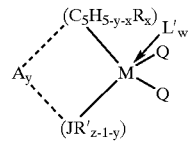

wherein M is Ti, Zr or Hf; $(C_5H_{5-y-x}R_x)$ is a cyclopentadienyl ring which is substituted with from 0 to 5 substituent groups R, "x" is 0, 1, 2, 3, 4 or 5 denoting the degree of substitution, and each substituent group R is, independently, a radical selected from a group consisting of $C_1-C_{20}$ hydrocarbyl radicals, substituted $C_1-C_{20}$ hydrocarbyl radicals wherein one or more hydrogen atoms is replaced by a halogen atom, $C_1-C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4-C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1-C_{20}$ hydrocarbyl radicals wherein one or more hydrogen atoms is replaced by a halogen atom, y is 0 or 1, and "z" is the coordination number of the element J;

each Q is, independently any univalent anionic ligand such as halogen, hydride, or substituted or unsubstituted $C_1$–$C_{30}$ hydrocarbyl, alkoxide, aryloxide, amide or phosphide, provided that two Q may be an alkylidene, a cyclometallated hydrocarbyl or any other divalent anionic chelating ligand;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q.

For the purposes of this patent specification and appended claims, the terms "cocatalysts" and "activators" are used interchangeably and are defined to be any compound or component which can activate a metallocene compound as defined above, for example, a Lewis acid or a non-coordinating ionic activator or ionizing activator or any other compound that can convert a neutral metallocene catalyst component to a metallocene cation. It is within the scope of this invention to use alumoxane as an activator, and/or to also use ionizing activators, neutral or ionic, such as tri(n-butyl)ammonium tetrakis(pentafluorophenyl) boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529 and EP-A-0 561 476, EP-B1-0 279 586, EP-A-0 594-218 and WO 94/10180, all of which are fully incorporated herein by reference.

Ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568 and 5,384,299 and U.S. patent application Ser. No. 08/285,380, filed Aug. 3, 1994 and are all herein fully incorporated by reference. Combinations of activators are also contemplated by the invention, for example, alumoxanes and ionizing activators in combinations, see for example, WO 94/07928 and WO 95/14044 published May 26, 1995 and U.S. Pat. Nos. 5,153,157 and 5,453,410 all of which are herein fully incorporated by reference.

In an embodiment of the invention two or more catalyst components or metallocenes as described above can be combined to form a catalyst system useful in the invention. For example, those mixed catalysts described in U.S. Pat. Nos. 5,281,679, 5,359,015 and 5,470,811, all of which are fully incorporated herein by reference. In another embodiment of the catalyst system of the invention combinations of one or more of catalyst components of general formula (I) and/or (II) are contemplated. In one embodiment, metallocene catalyst components can be combined to form the blend compositions as described in PCT publication WO 90/03414 published Apr. 5, 1990, fully incorporated herein by reference. In yet another embodiment mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution.

In another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255, 5,183,867, 5,391,660 and 5,395,810 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride, and resinous support materials such as polystyrene or polystyrene divinyl benzene polyolefins or polymeric compounds or any other organic or inorganic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina and magnesia, titania, zirconia, and the like.

It is preferred that the carrier of the catalyst of this invention has a surface area in the range of from about 10 to about 700 $m^2/g$, pore volume in the range of from about 0.1 to about 4.0 cc/g and average particle size in the range of from about 10 to about 500 $\mu$m. More preferably, the surface area is in the range of from about 50 to about 500 $m^2/g$, pore volume of from about 0.5 to about 3.5 cc/g and average particle size of from about 20 to about 200 $\mu$m. Most preferably the surface area range is from about 100 to about 400 $m^2/g$, pore volume from about 0.8 to about 3.0 cc/g and average particle size is from about 20 to about 100 $\mu$m. The average pore size of the carrier of the invention typically has pore size in the range of from 10 to 1000 Å, preferably 50 to about 500 Å, and most preferably 75 to about 350 Å.

The catalyst system of the invention can be made in a variety of different ways as previously described. In one embodiment the catalyst is unsupported, see U.S. Pat. No. 5,317,036 and EP-A-0 593 083 incorporated herein by reference. In the preferred embodiment, the catalyst system of the invention is supported. Examples of supporting the catalyst system used in the invention are described in U.S. Pat. Nos. 4,937,217, 4,912,075, 4,935,397, 4,937.301, 4,914,253, 5,008,228, 5,086,025, 5,147,949, 4,808,561, 4,897,455, 4,701,432, 5,238,892, 5,240,894, 5,332,706, 5,346,925, 5,422,325, 5,466,649. 5,468,702, U.S. application Ser. No. 271,598, filed Jul. 7, 1994 and PCT Publication WO 95/32995 and WO 95/14044 and all of which are herein fully incorporated by reference.

In one embodiment of the process of the invention, olefin(s), preferably $C_2$ to $C_{30}$ olefin(s) or alpha-olefin(s), preferably ethylene or propylene or combinations thereof are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 5,283,278 and 4,921,825 and EP-B-0279 863 all of which are herein fully incorporated by reference.

In another embodiment of the invention, the supported catalyst system of the invention includes an antistatic agent or surface modifier, for example, those described in U.S. Pat.

No. 5,283,278 and U.S. patent application Ser. No. 08/322, 675, filed Oct. 13, 1994, which are fully incorporated herein by reference. Non-limiting examples of antistatic agents and surface modifiers include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention, however, it is preferred that it is added after the supported catalyst system of the invention is formed, in either a slurry or dried state.

A preferred method for producing the catalyst of the invention is described below and can be found in U.S. application Ser. Nos. 265,533, filed Jun. 24, 1994 and 265,532, filed Jun. 24, 1994, both are herein fully incorporated by reference in their entirety. In a preferred embodiment, the metallocene catalyst component is slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are mixed together and added to a porous support or the porous support is added to the solutions such that the total volume of the metallocene solution and the activator solution or the metallocene and activator solution is less than four times the pore volume of the porous support, more preferably less than three times, even more preferably less than two times, and still more preferably in the 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an aluminum-free ionizing activator such as those based on the anion tetrakis(pentafluorophenyl)boron as previously described, the mole ratio of the metal of the activator component to the transition metal component is preferably in the range of ratios between 0.3:1 to 3:1.

In another embodiment the catalyst loading in millimoles (mmoles) of metallocene to weight of support material in grams (g) is in the range of from about 0.001 to about 2.0 mmoles of metallocene per g of support material, preferably from about 0.005 to about 1.0, more preferably from about 0.005 to 0.5 and most preferably from about 0.01 to 0.15.

Polymerization Process

The catalysts and catalyst systems of this invention are suited for the polymerization of monomers and optionally comonomers in preferably a gas phase process.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the process by a cooling system external to the reactor. The recycle stream is withdrawn from the fluidized bed, cooled, and recycled back into the reactor. Simultaneously, polymer product is withdrawn from the reactor and new or fresh monomer and catalyst is added to replace the polymerized monomer and consumed catalyst. See for example U.S. Pat. Nos. 4,543,399, 4,588,790, 5,028,670, 5,382,638, 5,352, 749, 5,405,922, 5,436,304, 5,453,471 and 5,463,999 all of which are fully incorporated herein by reference.

In one embodiment, the invention is directed toward a polymerization process involving the polymerization of one or more of the monomer(s) including ethylene alone or in combination with one or more linear or branched monomer (s) having from 3 to 30 carbon atoms, preferably 3–12 carbon atoms, more preferably 4 to 8 carbon atoms. The process is particularly well suited to the copolymerization reactions involving the polymerization of ethylene in combination with one or more of the monomers, for example alpha-olefin monomers of propylene, butene-1, pentene-1, 4-methylpentene-1, hexene-1, octene-1, decene-1, styrene and cyclic and polycyclic olefins such as cyclopentene, norbornene and cyclohexene or a combination thereof. Other monomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In another embodiment ethylene is polymerized with at least two different comonomers to form a terpolymer and the like, the preferred comonomers are a combination of monomers, alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornadiene, ethylene/propylene/1, 4-hexadiene and the like.

In the preferred embodiment, the process of the invention is operated substantially free of or in the absence of a scavenger. It is preferred that if a scavenger is used that no more than about 50 ppm of the scavenger is used based upon the total weight of the fluidized bed is present at any given point in time during the process of the invention. See U.S. application Ser. No. 306,055 filed Aug. 14, 1995, which is herein incorporated by reference. Non-limiting examples of scavenger compounds include for example, triethylaluminum (TEAL), trimethylaluminum (TMAL), tri-isobutylaluminum (TIBAL) and tri-n-hexylaluminum (TNHAL) and diethyl aluminum chloride (DEAC) and the like.

In one embodiment, where homopolymers are produced, the reactor temperature of the process of the invention is in the range of from about 70° C. to about 130° C., preferably 75° C. to 125° C., even more preferably from about 80° C. to about 120° C. and most preferably 85° C. to about 115° C. In another embodiment, where copolymers are produced, the reactor temperature of the process of the invention is in the range of from about 70° C. to about 120° C., preferably 70° C. to 115° C., even more preferably from about 70° C. to about 110° C. and most preferably 70° C. to about 100° C.

The ethylene partial pressure of the process of the invention is generally in the range of from about 30 psi (207 kPa) to about 250 psi (1724 kPa), preferably in the range of 30 psi (207 kPa) to 200 psi (1379 kPa), more preferably from about 35 psi (241 kPa) to 175 psi (1207 kPa), and most preferably from about 40 psi (276 kPa) to about 150 psi (1034 kPa). In another embodiment, the ethylene partial pressure is greater than 40 psi (276 kPa), preferably greater than 45 psi (310 kPa), more preferably greater than 50 psi (345 kPa), even more preferably greater than 55 psi (379 kPa) and most preferably greater than about 60 psi (414 kPa).

The total reactor pressure of the process of the invention is up to about 1000 psig (6895 kPag), preferably in the range of 150 psig (1034 kPag) to about 600 psig (4137 kpag), more preferably in the range of 200 psig (1379 kpag) to about 500 psig (3447 kPag), even more preferably in the range of 225 psig (1551 kPag) to about 400 psig (2758 kPag) and most preferably in the range of 250 psig (1724 kPag) to 400 psig (2758 kPa).

In yet another embodiment, where homopolymers are produced, the ethylene partial pressure is in the range of 30 psi (207 kPa) to 150 psi (1034 kPa) and the reactor temperature is in the range of 80° C. to 120° C., preferably the ethylene partial pressure is in the range of 40 psi (276 kPa) to 120 psi (827 kPa) and the reactor temperature is in the range of 85° C. to 110° C., more preferably the ethylene partial pressure is in the range of 50 psi (345 kPa) to 120 psi (827 kPa) and the reactor temperature is in the range of 85° C. to 120° C., most preferably the ethylene partial pressure is in the range of 60 psi (414 kPa) to 120 psi (827 kPa) and the reactor temperature is in the range of 90° C. to 120° C.

In yet another embodiment, where copolymers are produced, the ethylene partial pressure is in the range of 30 psi (207 kPa) to 150 psi (1034 kPa) and the reactor temperature is in the range of 65° C. to 120° C., preferably the ethylene partial pressure is in the range of 40 psi (276 kPa) to 120 psi (827 kPa) and the reactor temperature is in the range of 65° C. to 110° C., more preferably the ethylene partial pressure is in the range of 50 psi (345 kPa) to 120 psi (827 kPa) and the reactor temperature is in the range of 65° C. to 105° C., most preferably the ethylene partial pressure is in the range of 60 psi (414 kPa) to 120 psi (827 kPa) and the reactor temperature is in the range of 70° C. to 100° C.

It is also contemplated by the process of the invention that hydrogen may be used to control the molecular weight of the polymer product, see U.S. Pat. Nos. 4,939,217 and 3,051,690 both of which are herein fully incorporated by reference.

Polymer Products

The activation energy of viscous flow ($E_a$) can be used as an indication of processability of the polymers produced by the process of the invention. Graessley (Accounts of Chemical Research, 10, 332, (1977)) and Mendelson (Trans. of the Soc. of Rheology, 9:1, 53 (1965)) both of which are herein fully incorporated by reference have related an increase in $E_a$ to the presence of branching in polymers. $E_a$ can be measured using rheological techniques well known in the art. For example, the measurement of $E_a$ using a capillary, parallel plate, or oscillatory rheometers may be used to obtain the viscous energy of activation using a capillary rheometer is given by the above Mendelson article incorporated herein by reference.

The $E_a$ of a conventional high density ethylene homopolymer (HDPE) is 6.3 kcal/mol (Mendelson, Trans. of the Soc. of Rheology, 9:1, 53 (1965)), however current experimental data based on extrapolation of copolymers of varying comonomer composition to zero comonomer content produces a value of 6.6 kcal/mol. Thus, the fact that the polymers of the invention have $E_a$ higher than the $E_a$ of these conventional homopolyethylene indicates that the polymers of the invention have a higher level of branching. A typical high pressure low density polymer (LDPE) produced by a free-radical polymerization process has an $E_a$ ranging from about 11 kcal/mole to about 14 kcal/mole.

For polyethylene, $\Delta E_a$ is defined to be the $E_a$ value of the polymer of the invention minus the $E_a$ of a conventional homopolyethylene, which for the purposes of this patent specification and appended claims is 6.6 kcal/mole. It is known in the art that $E_a$ is influenced by the presence of short chain branching. Therefore, when measuring $E_a$ for ethylene copolymers, the component attributable to the level of short chain branching should be subtracted out. When correcting for short chain branching the measured $E_a$ for a copolymer of the invention minus the $E_a$ of a linear short chain branched copolymer with a similar comonomer content ($\Delta E_a$) should be equal to or greater than 1.0, preferably the difference is greater than 1.5, more preferably greater than 2 and most preferably greater than 3.

In one embodiment, the polymers produced by the process of the invention have an $E_a$ of greater than 6.6 kcal/mole and/or a $\Delta E_a$ equal to or greater than 1 kcal/mole for homopolyethylene, or an $E_a$ greater than 7.6 kcal/mole and/or $\Delta E_a$ equal to or greater than 1 kcal/mole for an ethylene copolymers as measured by the techniques described above.

In an embodiment, the homopolymers of the invention have an $E_a$ greater than or equal to about 6.9 kcal/mol, more preferably greater than 7 kcal/mol, more preferably greater than 8 kcal/mol and even more preferably greater than about 10 kcal/mol.

In one embodiment, the $E_a$ of the homopolymers of the invention are in the range of from about 6.9 kcal/mole to about 20 kcal/mole, preferably in the range of greater than 7 kcal/mole to about 12 kcal/mole, even more preferably from about 7.1 kcal/mole to about 12 kcal/mole.

In an embodiment, the ethylene copolymers, terpolymers and the like of the invention have an $E_a$ greater than about 7.6 kcal/mol, more preferably greater than 8 kcal/mol, more preferably greater than 8.5 kcal/mol and even more preferably greater than about 9 kcal/mol and most preferably greater than 10 kcal/mol.

In one embodiment, the $E_a$ of the ethylene copolymers, terpolymers and like of the invention are in the range of from about 7.6 kcal/mole to about 25 kcal/mole, preferably in the range of greater than 8 kcal/mole to about 20 kcal/mole, even more preferably from about 8.5 kcal/mole to about 15 kcal/mole.

In another embodiment the polymers of the invention have a weight average molecular weight (Mw) in the range of from about 20,000 daltons to about 2,000,000 daltons, preferably from about 30,000 daltons to about 500,000, more preferably from about 40,000 daltons to about 300,000 daltons, and most preferably from about 50,000 daltons to about 250,000 daltons.

Molecular weight distribution ($M_w/M_n$=MWD) is generally described as the ratio of the weight average molecular weight ($M_w$) to the number average molecular weight ($M_n$).

In an embodiment, the polymers of this invention have a $M_w/M_n$ in the range of from about 2 to 10, preferably in the range of 2.5 to 8, more preferably in the range of from about 2.5 to 7 and most preferably from greater than 3 to about 6. In another embodiment, the polymers of the invention have a molecular weight distribution greater than 2.5, preferably greater than 3 and most preferably greater than 3.1, but not greater than 10.

In another embodiment of this invention, a mixed catalyst system can produce a polymer having a $M_w/M_n$ in the range of from about 3 to 30, preferably in the range of 4 to 20, more preferably in the range of 4 to 15, most preferably in the range of from about 4 to less than 8.

The $M_z/M_w$ (the ratio of the third moment to the second moment) of the polymers of the invention are less than 4, preferably less than 3.5, even more preferably less than 3 and most preferably less than about 2.5. In another embodiment the preferred ranges for $M_z/M_w$ for the polymer of the invention are in the range of about greater than 3 to 4, preferably about 2.7 to about 3.5 and even more preferably from about 2, preferably from 2.1, to about 3.

The homopolyethylene polymer compositions of the invention have a density in the range of from about 0.94 g/cc to about 0.97 g/cc, preferably about 0.95 g/cc to about 0.965 g/cc.

In another embodiment the copolymer compositions of the invention have densities in the range of about 0.87 g/cc to about 0.95 g/cc, preferably in the range of about 0.90 g/cc to about 0.95 g/cc, even more preferably from about 0.905 g/cc to about 0.945 g/cc and most preferably from about 0.910 g/cc to about 0.94 g/cc.

Another important characteristic of the copolymers of the invention are their composition distribution (CD). A measure of composition distribution is the "Composition Distribution Breadth Index" (CDBI). CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference. See PCT Patent Application WO 93/03093, published Feb. 18, 1993 incorporated herein by reference for details on measuring CDBI.

In one embodiment, the copolymers of the invention have a composition distribution breadth index greater than 50 percent, preferably greater than 55 percent, more preferably greater than 60 percent, even more preferably greater than 65 percent and most preferably greater than 70 percent. In another embodiment, the composition distribution breadth index of the polymer of the invention are in the range of from 50 percent to about 100 percent, preferably from about 55 percent to about 99 percent, more preferably from about 55 percent to about 90 percent and most preferably from about 60 percent to about 80 percent.

The Melt Index (MI) or $I_1$ measured by ASTM D-1238-E of the polymers of the invention are generally in the range of about 0.05 dg/min to about 1000 dg/min, preferably about 0.1 dg/min to about 300 dg/min, more preferably about 0.3 to about 200 dg/min and most preferably about 0.5 dg/min to about 100 dg/min.

In another embodiment the MI of the polymers are in the range of from about 0.5 dg/min to about 50 dg/min, preferably in the range of from 0.7 dg/min to about 20 dg/min, more preferably from 0.7 dg/min to about 10 dg/min and most preferably in the range from about 1 dg/min to about 5 dg/min.

In one embodiment of the invention the polymers of the invention can be described as satisfying the formula $M_w/M_n > I_{10}/I_2 - 4.63$, where $I_{10}$ is measured in accordance with ASTM D-1238 (190° C./10.0 kg). The $I_{10}/I_2$ ratio for the polymers of the invention are typically greater than or equal to 6.9, preferably greater than 7, and typically in the range of from greater than or equal to 6.9 to 20. In another embodiment, the $I_{10}/I_2$ ratio for the polymers of the invention are in the range of from 6.9 to 14, preferably 6.9 to less than 11.

EXAMPLES

In order to provide a better understanding of the present invention including representative advantages and limitations thereof, the following examples are offered.

The properties of the polymer were determined by the following test methods:

All molecular weights are weight average molecular weight unless otherwise noted. Molecular weights (weight average molecular weight ($M_w$) and number average molecular weight ($M_n$)) were measured by Gel Permeation Chromatography, unless otherwise noted, using a Waters 150 Gel Permeation Chromatograph equipped with a differential refractive index detector and calibrated using polystyrene standards. Polymer samples were dissolved in trichlorobenzene solvent at 165° C. and the solutions were run at 145° C. using three Shodex GPC AT-80 M/S columns in series. This general technique is discussed in "Liquid Chromatography of Polymers and Related Materials III'" J. Cazes Ed., Marcel Decker, 1981, page 207, which is incorporated by reference herein. No corrections for column spreading were employed; however, data on generally accepted standards, e.g. National Bureau of Standards Polyethylene 1475, demonstrated a precision with 0.1 units for $M_w/M_n$ which was calculated from elution times. The numerical analyses were performed using Expert Ease™ software available from Waters Corporation.

Density was measured according to ASTM D-1501.

$I_{10}$ is measured by ASTM D-1238(190° C./10.0 kg) and $I_2$ is measured by ASTM D-1238-E.

Rheological data was measured as follows. A sample of the polymer produced in Example 1–11 was stabilized with a 1 wt. % mix of 1:2 IRGANOX 1076™/IRGAFOS 168υ.

For the purposes of this patent specification and appended claims the activation energy of viscous flow $E_a$ is measured by parallel plate oscillatory (equipment—Rheometrics RMS-800, a RDS or System IV can be used) shear measurements performed over the frequency range, 0.1–100 rad/sec at each of four temperatures (150° C., 170° C., 190° C., and 220° C.) at a maximum strain such that the data are taken in the linear viscoelastic regions, and then, using the well known temperature-frequency superposition, specifically horizontal shifting of the logarithm of the complex modulus at each temperature along the logarithmic frequency axis, to obtain shift factors, which are then fitted to an Arrhenius equation to yield $E_a$.

The $E_a$ of the polymers of Examples 1–10 were determined as described above and the results given in Table 1.

The following materials were used in all examples: Silica: MS948, 1.6 mL/g pore volume. W. R. Grace, Davison Chemical Division, Baltimore, Md. (Davison Chemical Co.) previously heated to 800° C. under nitrogen.

Bis(cyclopentadienyl)zirconium dichloride: Strem Chemicals, Inc., Newburyport, Mass.

Rac-dimethylsilylbis(indenyl)hafnium dichloride and rac-dimethylsilylbis(indenyl)zirconium dichloride were produced as similarly described in U.S. Pat. No. 5,017,714 fully incorporated herein by reference.

Methylalumoxane: Thirty weight percent clear MAO solution in toluene available from Ethyl Corporation, now Albemarle, Baton Rouge, La.

EXAMPLE 1

Catalyst Preparation

Preactivation of the catalyst was performed by the addition of 0.58 g bis(cyclopentadienyl)zirconium dichloride (2.0 mmol) to 37.47 g of a clear methylalumoxane solution (193.7 mmol aluminum) diluted with 42.8 g (49.5 mL) of dry toluene in a 500 ml round bottomed flask and swirled. The silica, 30 g (1.6 mL/g pore volume) was heated to 800° C. under nitrogen as follows: heated to 250° C. over 8 hours and maintained at 250° C. for 8 hours, and then heated to 800° C. over 8 hours and maintained at 800° C. for 8 hours. This silica was added to the catalyst solution and mixed to a pasty uniformity. The mixture was dried in vacuo at 25° C. to give a finely divided free-flowing solid. Weighing the mixture gave 41.0 g supported catalyst.

Polymerization

The polymerization run was performed in a 2-liter autoclave reactor equipped with an anchor impeller, an external water jacket for temperature control, a regulated supply of dry nitrogen, ethylene, ethylene/butene gas mixture, and reactor ports for the introduction of seed bed, scavenger, other comonomers, hydrogen, and catalyst.

The reactor was dried and degassed at 140° C. under nitrogen for a minimum of one hour prior to use. A typical run consisted of introducing 200 g dried sodium chloride as the seed bed and 0.2 ml triethylaluminum (TEAL, 25 weight % in heptane) to the reactor as the scavenger, stirred for one minute at room temperature, and then the temperature of the reactor contents was raised to 110° C. The reactor was then vented and purged with nitrogen for 30 minutes at about 1 psi (6.89 kPa) above atmospheric pressure. Then, the nitrogen purge was stopped, and the reactor temperature equilibrated to a reaction temperature of 100° C. The catalyst, 1000 mg as prepared above, was then injected under nitrogen pressure into the reactor. Then 40 psi (276 kPa) of ethylene monomer was pressured into the reactor and the flow of ethylene left open to maintain a constant pressure throughout the run. The polymerization reaction was limited to 60 minutes. The reaction was quenched by venting and rapid cooling of the system. The catalyst was killed by air exposure and the reactor contents were poured into distilled water to dissolve the seed bed. Polyethylene was recovered by filtration and rinsed by passing toluene, methanol and hexane through a Buchner funnel containing the polymer. The polyethylene product recovered had a $M_w$ of 72,000, a $M_n$ of 16,000 and a molecular weight distribution of about 4.0.

EXAMPLE 2

Using the same general procedure including the same catalyst system as described in Example 1 except the reactor was pressured with 150 psig (1030 kPa) of ethylene and the flow of ethylene left open to maintain this constant pressure throughout the run. The polyethylene product recovered had a $M_w$ of 121,000, a $M_n$ of 39,000, a molecular weight distribution of about 3.1 and a $I_{10}/I_2$ of 7.1.

COMPARATIVE EXAMPLE 3

Using the same general procedure using the same catalyst as described in Example 1, except the reactor was pressured with 300 psig (2070 kPa) of ethylene and the flow of ethylene left open to maintain this constant pressure throughout the run. The polyethylene product recovered had a $M_w$ of 123,000, a $M_n$ of 41,000, a molecular weight distribution of about 3.0 and a $I_{10}/I_2$ of 6.9.

EXAMPLE 4

Using the same general procedure and catalyst as described in Example 1, except the reactor was heated to 110° C. and the reactor was pressured with 40 psig (276 kPa) of ethylene and the flow of ethylene left open to maintain this constant pressure throughout the run. The polyethylene product recovered had a $M_w$ of 48,000, a $M_n$ of 12,000 and a molecular weight distribution of about 4.0.

EXAMPLES 5–9

The same general polymerization procedure and catalyst of Example 1 was used for examples 5 and 7–9. The pressures, temperatures and product characteristics are described below in Table 1. In example 6 the same general polymerization procedure of Example 1 was used except that the metallocene component was rac-dimethylsilylbis (indenyl)hafnium dichloride (2.0 mmol). The results are given in Table 1.

EXAMPLE 10

Catalyst Preparation

To an eight liter vessel equipped with a cooling jacket and an overhead stirrer was added 904 ml of 30 weight percent methylalumoxane in toluene (4.2 mole aluminum). While stirring a solution of 20 g of rac-dimethylsilylbis-(indenyl) zirconium dichloride in 950 ml of toluene was slowly added over a period of 5 minutes to the vessel. After adding the above solution and stirring for an additional 2 minutes, 200 g of Davison 948 dehydrated silica (dried at 800° C. as described in Example 1) was added over a three minute period. Stirring continued for four minutes and then the reaction mixture was gradually heated to 47° C. over a 30 minute time period while a vacuum was applied from the top of the vessel. A slight nitrogen purge into the bottom of the vessel was used to assist in the solvent removal. Ninety minutes later the reaction mixture was very viscous. Heating was increased gradually to 63° C. over the next three hours. At this point the supported catalyst was a dry free flowing solid, which was allowed to cool to ambient temperature. To the solid catalyst 6.1 L of isopentane was added to form a slurry. The slurry was cooled to −5° C. and ethylene was slowly added via a dip tube at a rate of 2.1 L/min. This was gradually increased to 3.9 L/min over eighty minutes. When the temperature reached about 16° C., the flow of ethylene was stopped. Agitation was then halted and the prepolymerized catalyst allowed to settle. The liquid phase was then decanted and the solids washed twice with isopentane, and transferred to a dry box. The slurry was passed through a sieve (#14), filtered and washed three times with 4 L of pentane. The solids were then dried under vacuum at ambient temperature for 3.5 hours to yield 686 g of a medium yellow solid (bulk density of 0.407 g/cc, 0.58 wt % Zr calculated).

Polymerization

In this Example 10 the same general polymerization procedure of Example 1 was used except that the prepolymerized supported metallocene catalyst prepared above was used. The results are given in Table 1.

TABLE 1

| Ex. # | Yield (g) | Temp. (°C) | [1]C$_2$= psi (kPa) | M$_w$ | M$_n$ | M$_w$/M$_n$ (MWD) | I$_{10}$/I$_2$ | M$_z$/M$_w$ | [2]Pressure psig (kPag) | E$_a$ (kcal/mol) |
|---|---|---|---|---|---|---|---|---|---|---|
| 1 | 9.2 | 100 | 40 (276) | 72,000 | 16,000 | 4.4 | not measured | 2.2 | 90 (620) | 8.0 |
| 2 | 15.2 | 100 | 150 (1034) | 121,000 | 39,000 | 3.1 | 6.9 | 3.4 | 209 (1441) | 7.6 |
| C3 | 85.8 | 100 | 300 (2068) | 123,000 | 41,000 | 2.9 | 6.4 | 2.0 | 354 (2440) | 6.2 |
| 4 | 8.1 | 110 | 40 (276) | 48,000 | 12,000 | 4.0 | not measured | 2.5 | 94 (648) | 10.1 |
| 5 | 15.8 | 85 | 40 (276) | 98,000 | 28,000 | 3.6 | not measured | 2.1 | 106 (730) | 7.3 |
| 6 | 7.9 | 100 | 40 (276) | 223,000 | 32,000 | 7.0 | not measured | 3.5 | 97 (668) | 12.5 |
| 7 | 41.2 | 100 | 100 (689) | 92,000 | 25,000 | 3.7 | 7.2 | 2.1 | 148 (1020) | 9.1 |
| 8 | 7.9 | 100 | 40 (276) | 64,000 | 16,000 | 4.1 | not measured | 2.3 | 88 (606) | 10.0 |
| 9 | 5.8 | 120 | 40 (276) | 31,000 | 8,000 | 3.9 | not measured | 2.4 | 96 (661) | not measured |
| 10 | 12.1 | 100 | 40 (276) | 48,000 | 11,000 | 4.3 | not measured | 2.8 | 106 (730) | 11.2 |

[1]C$_2$= is ethylene partial pressure
[2]Pressure is the total reactor pressure The polymers produced by this invention can be used in a wide variety of products and end-use applications. Polymers produced by the process of the invention are useful in such forming operations as film, sheet, and fiber extrusion and co-extrusion as well as blow molding, injection molding and rotary molding. The polymers of the invention can be formed into blown or cast films formed by coextrusion or by lamination. These films would be useful as shrink films, cling films, stretch films, sealing films, oriented films, snack packages, heavy duty bags, grocery sacks, baked and frozen food packages, medical packages, industrial liners, membranes, etc. in food-contact and non-food contact applications. Fibers that include melt spinning, solution spinning and melt blown fiber operations for use in woven or non-woven form to make filters, diaper fabrics, medical garments, geotextiles, etc., extruded articles that include medical tubing, wire and cables, geomembranes, and pond liners, molded articles that include single and multi-layered constructions in the form of bottles, tanks, large hollow articles, rigid food containers and toys, etc. all can be made from the polymers of the invention. The polymers of this invention can also be functionalized or maleated, produced into foams and even used as additives or lubricants in petroleum products such as oil.

While the present invention has been described and illustrated by reference to particular embodiments, it will be appreciated by those of ordinary skill in the art that the invention lends itself to variations not necessarily illustrated herein. For example, it is within the scope of this invention to include a traditional Ziegler-Natta catalyst with a catalyst of the invention or to blend the polymers of this invention with other metallocene catalyzed polymers or conventional polymers such as linear low density polyethylene, polypropylene, high density polyethylene or even high pressure low density polyethylene. Also, the process of the invention can be used in a single reactor or in a series reactor or even in series where one reactor is a slurry reactor or a solution reactor and the other being a gas phase reactor or any combination thereof. For this reason, then, reference should be made solely to the appended claims for purposes of determining the true scope of the present invention.

We claim:

1. A continuous gas phase process for polymerizing olefins in the presence of a catalyst system consisting essentially of one or more unbridged metallocene catalysts to form a polyolefin product having an activation energy of viscous flow (E$_a$) greater than or equal to 7.6 kcal/mole, the process comprising a) introducing to a reactor ethylene; and, optionally, one or more comonomers; b) cycling said ethylene and optional comonomers through a fluidized bed containing said catalyst system on support material; c) employing a continuous recycle stream containing said ethylene and optional comonomers; d) withdrawing a polyethylene product; and e) replacing the withdrawn polyethylene product and consumed catalyst with new said ethylene and optional comonomers and new said catalyst system; said process conducted such that the ethylene partial pressure is from about 40 psi to about 150 psi and the reactor temperature is in the range of 85 to 110° C.;

whereby reduction of partial pressure of said ethylene and varying the reactor temperature, results in said activation energy being greater than or equal to 7.6 kcal/mole.

2. The process of claim 1 wherein the ethylene partial pressure is less than 150 psi.

3. The process of claim 1 wherein the homopolymer polyethylene product has an E$_a$ in the range of from about 7.6 kcal/mole to 20 kcal/mole.

4. The process of claim 1 wherein each of said one or more unbridged metallocene catalysts are represented by the formula:

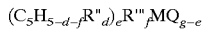

wherein M is a Group 4, 5, or 6 transition metal, at least one (C$_5$H$_{5-d-f}$R"$_d$) is an unsubstituted or substituted cyclopentadienyl ligand bonded to M, each R", which can be the same or different, is hydrogen or a substituted or unsubstituted hydrocarbyl having from 1 to 30 carbon atoms or where two R" are joined together to form a part of a substituted or unsubstituted ring or ring system having 4 to 30 carbon atoms, R'" is a radical bridging two (C$_5$H$_{5-d-f}$R"$_d$) rings, or bridging one (C$_5$H$_{5-d-f}$R"$_d$) ring to M, said radical containing one or more of carbon, germanium, silicon, phosphorous or nitrogen atoms; each Q which can be the same or different is a hydride, substituted or unsubstituted hydrocarbyl having from 1 to 30 carbon atoms, halogen, alkoxides, aryloxides, amides, phosphides or any other univalent anionic ligand; two Q can be an alkylidene ligand or cyclometallated hydrocarbyl ligand or other divalent anionic chelating ligand, where g is an integer corresponding to the formal oxidation state of M, d is 0, 1, 2, 3, 4 or 5, f is 0 and e is 1, 2 or 3.

5. The process of claim 4 wherein e is 2.

6. The process of claim 1 wherein the reactor has an ethylene part pressure in the range of from 40 psi to about 120 psi and a temperature in the range of from about 90° C. to about 110° C.

7. The process of claim 1 wherein the polymer product has a I$_{10}$/I$_2$ of greater than 6.9.

8. The process of claim 7 wherein the homopolymer polyethylene product has a I$_{10}$/I$_2$ of greater than 7.

9. The process of claim 8 wherein the homopolymer polyethylene product has a molecular weight distribution greater than 3, the process operating in the absence of scavenger.

10. The process of claim 9 wherein the homopolymer polyethylene product has a density greater than 0.94 g/cc.

11. The process of claim 9, wherein the process is operating at an ethylene partial pressure of less than 150 psi and a reactor pressure less than 300 psig.

* * * * *